Jan. 21, 1958   H. E. PRESSEY   2,820,396
TENSION CONTROL FOR ADJUSTMENT MECHANISMS
Filed June 7, 1955

INVENTOR
HENRY E. PRESSEY
BY
Herbert C Kimball
his ATTORNEY

United States Patent Office 2,820,396
Patented Jan. 21, 1958

2,820,396

TENSION CONTROL FOR ADJUSTMENT MECHANISMS

Henry Emerson Pressey, Buffalo, N. Y., assignor to American Optical Company, Southbridge, Mass., a voluntary association of Massachusetts Application June 7, 1955, Serial No. 513,724

4 Claims. (Cl. 88—39)

This invention relates to adjustment mechanism for microscopes and similar manually operated instruments and provides variable tension control means which, while simple and inexpensive to make, is easy to assemble, is conveniently located and is easy to adjust when a change in tension for the adjustment mechanism of the instrument is desired. Moreover, when a desired degree of tension adjustment has been obtained, the tension control means may be firmly secured in adjusted position so that no unwanted looseness or change in tension will occur during ensuing operation of the mechanism.

Different individuals or users of a hand-operated instrument often prefer different degrees of tension or resistance to rotation for the control means of the instrument, and such change in adjustment should be convenient and available at any time.

It is accordingly an object of the present invention to provide, for use with a manual adjustment mechanism or the like, a simple and inexpensive variable tension control means which may afford various degrees of tension adjustment for different users of the associated instrument. One advantage of the invention is that the control means may be easily adjusted, and easily and firmly secured against changes after a desired degree of tension between the parts or resistance to rotation of the parts has been accomplished.

Other objects and advantages of the invention will become apparent from the detailed description which follows when taken in conjunction with the accompanying drawing in which.

Figure 3:
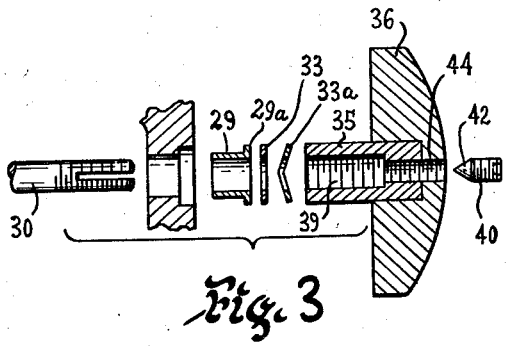
Fig. 3 is an exploded view of certain parts shown in Fig. 2.
Figure 1:
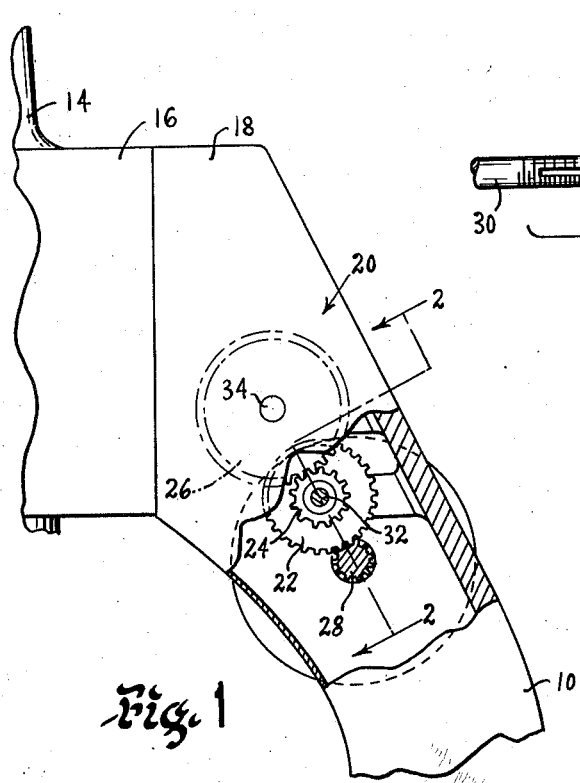
Fig. 1 is a fragmentary side elevational view of an adjustment mechanism for a microscope or the like, parts thereof being broken away and other parts shown in section.

Referring to the drawings in detail and particularly to Fig. 1, the numeral 10 indicates an upper portion of a microscope stand or the like having a body tube 14 carried by a block 16 connected by a dovetail connection or the like 18 for relative vertical sliding motion therebetween. Such a dovetail connection is a common means for varying the focus of microscopes and similar manually operated instruments and forms no part of my invention. In order to provide a control for such sliding motion, an adjustment mechanism generally indicated by the numeral 20 is shown in part therein. The adjustment mechanism may be any suitable mechanical movement and as illustrated in the drawings comprises a train of gears 22, 24 and 26 arranged to receive power from a pinion 28 centrally mounted on a manually rotated element 30. In accordance with my invention I control the force, otherwise referred to as "tension," which is required to turn the actuating element 30, by applying varying degrees of braking action to turning of the element 30 relative to the microscope and more particularly the microscope stand 10. In the detailed disclosure in the drawings the element 30 is journaled in a pair of flanged collars 29 fixed in side wall portions of the stand 10 and functionally forming a part thereof. Thus manual rotation of the actuating element 30 will cause gear 28 to transmit power through gears 22, 24 and 26 for slight moving purposes in known manner, the gears 22 and 24 being mounted on a stub shaft 32 and gear 26 on a similar shaft 34 normally fixedly supported in the side wall portions of the hollow arm of the stand 10.

A pair of manual control knobs 36 and 36' are provided at opposite ends of the actuating shaft 30 for rotating same when the slide block 16 is to be moved upwardly or downwardly. It is desirable in such an adjustment mechanism to have the resistance offered thereby sufficient to prevent rotation of the parts due to the weight supported thereby, and also desirable at the same time to adjust this resistance or tension to suit the individual desiring to use the mechanism. Tension control mechanisms for such instruments are not new, but the present invention embodies means whereby the desired control of tension or resistance to rotation of the parts and desired "feel" for the control mechanism may be accomplished easily and inexpensively.

In the particular construction selected to illustrate my invention, braking means including a braking element in the form of a sleeve 35 on the shaft 30, and a stationary reaction element cooperate to determine the tension required to turn the shaft 30. The reaction element of the braking means may, as above explained, be the stand 10 itself or a flanged collar 29 fixed in side wall portions thereof. The braking action takes hold more gradually if friction washers 33 are positioned between the inner ends of each of the sleeves 35 and the reaction element, with at least one of said friction washers 33a being deformed in known fashion to afford resiliency. The shaft 30 carrying pinion 28 centrally thereon is threaded at each of its opposite ends 31, and these ends are arranged to extend somewhat outwardly beyond the opposite sides of the stand 10. The threaded portions 31 thus are arranged to fit inside the internally threaded braking elements 35, which move in and out relative to actuating element 30 due to threaded engagement therewith when rotated relative thereto. In the form shown, the control knobs 36 are fixed to the braking elements 35. When it is desired to change the tension required to turn the shaft 30, one control knob 36 is held stationary while the other knob is rotated to screw one or both of the braking elements 35 inwardly or outwardly slightly as desired to change the pressure of the braking element against the reaction element. Greater resilience in such pressure is afforded if a spring washer is used, such as the spring washer 33a above described, in that the braking action takes place with the spring washer 33a clamped under compression.

When the correct amount of tension to suit the individual's preference has been obtained, each braking element 35 may be locked in adjusted position by means of a small set screw 40 which is provided with a conically shaped inner end 42. The screw 40 is threaded into an axially aligned threaded opening 44 in the knob 36 and sleeve 35 and is of sufficient length so that its inner end may engage the bifurcated end 31 of the shaft 30. As a result, this conically shaped or pointed inner end of the set screw 40 will tend to spread the four prongs 31a, 31b, 31c and 31d of the end 31 and set up a strong wedging action between the threads thereon and the complementary threads 39 within the sleeve 35. As shown, the ends 31 are doubly bifurcated, but as is obvious a single kerf instead of two will function successfully to set up the desired wedging action. A socket head type set screw is preferred since a rather firm engagement can be easily obtained thereby.

Figure 5:
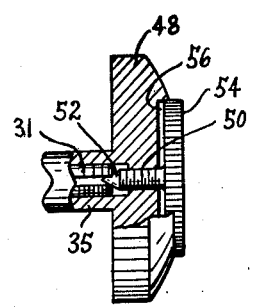
Fig. 5 is a fragmentary view partly in section of a modified form of the invention.
Figure 4:
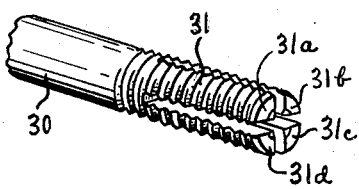
Fig. 4 is a perspective view of an element of the control mechanism.
Figure 2:
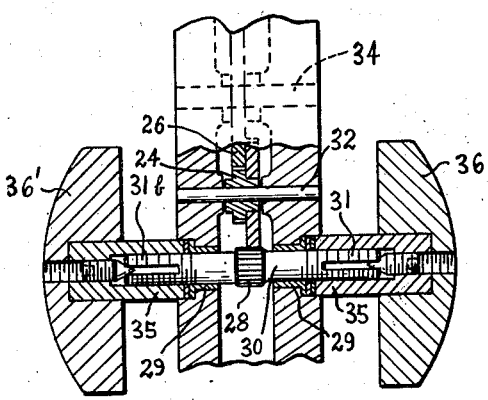
Fig. 2 is a fragmentary view partly in section taken upon section line 2—2 of Fig. 1 and looking in the direction of the arrows.

In Fig. 5 a modified form of the invention is disclosed and comprises instead of a small socket head type set screw 40, a set screw 50 having a similarly conically shaped inner end 52 for engaging the bifurcated end 31 of the shaft, but the outer end of this set screw is provided with an integral enlarged knurled head portion 54 arranged to fit partially into an enlarged circular recess 56 formed in the outer face of the knob 48. The purpose for such an arrangement is so that the set screw 50 may be adjusted into its locking position without requiring the use of any extra or auxiliary implement or tool such as is required in the earlier described construction. Since the diameter of the head 54 of the set screw 50 is fairly large, it may be gripped by the finger tips of the operator of the instrument and easily turned to release the pressure produced by the conically shaped inner end after which the knob 48 may be rotated for tension adjustment of the mechanism and thereafter the head 54 of the set screw 50 turned in the opposite direction to lock the parts securely in place. When this has been obtained, the operator of the instrument will grip the outer periphery of the knob 48 and there will be no tendency on his part to disturb the locked condition of the set screw 50.

As will be apparent from the foregoing description, the tension control may, in accordance with my invention, be placed on only one side or on both sides of the instrument. The braking means will function effectively if carried by one end only of the actuating element 30, the latter projecting at the one or at both sides of the instrument as desired. In the latter case, that is with actuating element 30 projecting to both sides of the instrument, it is desirable to provide a knob pinned on the side of the shaft opposite the braking or tension control means. It is obvious that the provision of braking means on both sides of the instrument has the advantage that the user of the instrument can adjust the tension with either the right hand or the left hand or by a combination of the two.

Having described my invention, I claim:

1. The combination in a microscope stand of adjustment mechanism therefor comprising an actuating shaft for said adjustment mechanism having a portion of said shaft projecting from each side thereof, a grip for manual rotation of said actuating shaft mounted on each of said projecting portions, braking means cooperating with said shaft and actuated by rotation of at least one of said grips relative to said shaft to increase and decrease the resistance to rotation of said shaft in response to differential torque imposed on said grips by the two hands of the operator, the projecting portion carrying said rotatable grip being split, and means for spreading said split projecting portion for holding said braking means under adjusted tension.

2. The combination in a microscope stand of adjustment mechanism therefor comprising an actuating shaft for said adjustment mechanism journaled in the stand and having an end portion projecting through each side thereof for manipulation by either hand of the user, at least one of said end portions being split, braking means cooperating with said shaft and including a braking element and a reaction element, said braking element being threaded on a split end portion of said actuating shaft to increase and decrease the braking effect on said actuating shaft as said braking element is rotated in opposite directions respectively relative to said actuating shaft and means for spreading the split end portion of said actuating shaft for securing said braking element in adjusted position.

3. The combination in a microscope stand of adjustment mechanism therefor comprising an actuating shaft for said adjustment mechanism having a split portion of said shaft projecting from each side thereof, a grip for manual operation of said actuating shaft threaded on each of said split portions, braking means cooperating with said shaft and actuated by rotation of at least one of said grips relative to said shaft for increasing and decreasing the tension required to turn said shaft in response to differential torque imposed on said grips by the two hands of the operator, and means for spreading the split portion carrying the grip so rotated for holding said braking means under adjusted tension.

4. The combination in a microscope stand of adjustment mechanism therefor comprising an actuating shaft for said adjustment mechanism journaled in the stand and having an end portion projecting through each side thereof for manipulation by either hand of the user, at least one of said end portions being split, braking means cooperating with said shaft and including a braking element, a reaction element and a spring washer between said elements, said braking element being threaded on a split end portion of said actuating shaft to increase and decrease the braking effect on said actuating shaft as said braking element is rotated in opposite directions respectively relative to said actuating shaft, and means for spreading the split end portion of said actuating shaft for securing said braking element in adjusted position.

References Cited in the file of this patent

UNITED STATES PATENTS 2,508,738   Aitcheson _____ May 23, 1950